US008508172B2

(12) United States Patent
Skaff

(10) Patent No.: US 8,508,172 B2
(45) Date of Patent: Aug. 13, 2013

(54) STATICALLY STABLE BIPED ROBOTIC MECHANISM AND METHOD OF ACTUATING

(75) Inventor: Sarjoun Skaff, Pittsburgh, PA (US)

(73) Assignee: Bossa Nova Concepts, LLC, Pittsburgh, PA (US)

( * ) Notice: Subject to any disclaimer, the term of this patent is extended or adjusted under 35 U.S.C. 154(b) by 0 days.

(21) Appl. No.: 13/185,050

(22) Filed: Jul. 18, 2011

(65) Prior Publication Data

US 2011/0272199 A1 Nov. 10, 2011

Related U.S. Application Data

(63) Continuation of application No. 12/167,636, filed on Jul. 3, 2008, now Pat. No. 7,982,423.

(51) Int. Cl.
*B25J 5/00* (2006.01)

(52) U.S. Cl.
USPC .......... 318/568.12; 301/5.21; 301/5.305; 301/6.5; 280/5.507; 280/5.508; 446/465; 446/489; 446/440; 446/442; 446/443; 180/9.32; 180/7.2; 180/7.1; 700/245; 901/1

(58) Field of Classification Search
USPC .......... 446/465, 489, 440, 442, 443, 463; 180/9.32, 7.2, 8.1, 7.1; 318/568.12; 700/245; 901/1; 301/5.21, 5.305, 6.5; 280/5.507, 280/5.508; 482/15, 16, 90
See application file for complete search history.

(56) References Cited

U.S. PATENT DOCUMENTS

| | | | | |
|---|---|---|---|---|
| 5,739,655 A | * | 4/1998 | Torii et al. | 318/568.12 |
| 5,791,425 A | * | 8/1998 | Kamen et al. | 180/7.1 |
| 6,308,791 B1 | * | 10/2001 | Spletzer et al. | 180/8.1 |
| 6,831,437 B2 | * | 12/2004 | Filo | 318/568.12 |
| 6,948,576 B2 | * | 9/2005 | Angeles | 180/23 |
| 7,327,112 B1 | * | 2/2008 | Hlynka et al. | 318/568.12 |
| 7,348,747 B1 | * | 3/2008 | Theobold et al. | 318/568.21 |
| 7,891,446 B2 | * | 2/2011 | Couture et al. | 180/9.32 |
| 2003/0127260 A1 | * | 7/2003 | Angeles | 180/23 |

* cited by examiner

*Primary Examiner* — Rita Leykin
(74) *Attorney, Agent, or Firm* — Eckert Seamans Cherin & Mellott, LLC; Stephen A. Bucchianeri

(57) ABSTRACT

A method of actuating a robotic mechanism having a first leg member rotatably coupled to a first side of a chassis and a second leg member rotatably coupled to a second side of the chassis. The method comprises positioning the first leg member and the second leg member generally about 180 degrees with respect to each other and effecting movement of the chassis by rotating both the first leg member and the second leg member with respect to the chassis.

20 Claims, 4 Drawing Sheets

STATICALLY STABLE BIPED ROBOTIC MECHANISM AND METHOD OF ACTUATING

CROSS REFERENCE TO RELATED APPLICATIONS

This application is a continuation of U.S. patent application Ser. No. 12/167,636 entitled "Statically Stable Biped Robotic Mechanism and Method of Actuating" filed Jul. 3, 2008, which claims the benefit of U.S. Provisional Application Ser. No. 60/947,948, filed Jul. 4, 2007, entitled "System and method for configuring a locomotion mechanism that enables a chassis to stand up from a sitting position and to statically balance on two legs even with point contacts to the ground and without the need for onboard sensing" as well as U.S. Provisional Application Ser. No. 61/037,688, filed Mar. 18, 2008, entitled "Efficient actuation configuration for two-legged robot locomotion", the contents of which are hereby incorporated herein by reference.

BACKGROUND OF THE INVENTION

1. Field of the Invention

The invention relates generally to robotic mechanisms and, more particularly, relates to robotic mechanisms having two legs and methods of actuating.

2. Background Information

Conventional electric-powered biped robots such as humanoid robots maintain balance by having large feet and actively controlling their body posture. By adjusting the posture, they position their center directly above the foot touching the ground to achieve stability. This is made easier with large feet that provide large contact areas with the ground. In most embodiments, such robots rely on inertia sensing to actively control the location of the center of gravity and maintain it above the feet.

Such balancing control strategies provide static stability, i.e. the robot maintains its balance throughout its walking gait. Its movement can be interrupted at any time without loss of stability. One example is the zero moment point (ZMP) strategy, commonly used in humanoids.

Conventional biped robots have multiple electric motors installed in their legs, such as at the hip, knee and ankle. Consecutive segments of the leg are typically connected by motor-gear articulations, which enables motions of these segments one relative to the other. The coordinated actuation of these articulations makes the leg describe specific trajectories and generate locomotion gaits.

The limitations of conventional electric-powered biped design are two folds. First, actively adjusting the posture to achieve static stability leads to relatively slow motions that do not mimic biological gaits, and requires elaborate sensors and computation. Second, motor-gear articulations dissipate considerable energy every time the foot touches the ground, because these transmissions do not store and restore energy efficiently. When the foot impacts the ground, energy is lost to inelastic collisions, making it difficult for biped robots to run dynamically.

The present invention addresses both limitations by providing sensor-free static stability without large feet, and enabling dynamic running with elastic legs. The robot's body configuration is designed such that its center of gravity is permanently below the hips, which leads to static stability even in the absence of feet. The legs are actuated by a single motor at the hip, making the legs describe complete circles around the hips. The legs are shaped in a spiral to enable the robot to stand up by simple actuation of the hip motors. No sensing is needed for static stability or standing up.

Dynamic running is made possible by forming the legs out of compliant material. This provides the legs with elastic properties so they can efficiently store and restore energy each time the leg touches the ground. This efficient exchange of energy enables the biped robot to run dynamically.

SUMMARY OF THE INVENTION

In accordance with one aspect of the invention, a robotic mechanism is provided. The robotic mechanism comprises: a chassis having a first side, an opposite second side and a center of mass; a first leg member rotatably coupled to the chassis proximate the first side, the first leg member being of generally spiral shape; and a second leg member rotatably coupled to the chassis proximate the second side, the second leg member being of generally spiral shape. Wherein a portion of the first leg member and a portion of the second leg member are structured to engage a surface, wherein the portion of the first leg member has a center of curvature and the portion of the second leg member has a center of curvature, and wherein the center of mass of the chassis is disposed below the center of curvature of the first leg member and the center of curvature of the second leg member.

The first leg member and the second leg member may rotate generally about a common axis and the center of mass of the chassis may be disposed below the common axis.

The first leg member and the second leg member may be formed from an elastically compliant material. The first leg member may include a first end and a second end with the first end being rotatably coupled to the chassis. The first leg member may be generally shaped such that the distance from the first end to a point on the first leg increases monotonically as the point describes the leg profile starting from the first end and ending at the second end. The distance from the first end to a point on the first leg member may remain constant over a portion of the first leg member as the point describes the profile of the portion moving along the portion from the first end of the first leg member toward the second end of the first leg member. The distance from the first end to a point on the first leg member may monotonically decrease over a portion of the first leg member as the point describes the profile of the portion moving along the portion from the first end of the first leg member toward the second end of the first leg member.

The second leg member may include a first end and a second end with the first end being rotatably coupled to the chassis. The second leg member may be generally shaped such that the distance from the first end to a point on the second leg member increases monotonically as the point describes the leg profile starting from the first end and ending at the second end. The distance from the first end to a point on the second leg member may remain constant over a portion of the second leg member as the point describes the profile of the portion moving along the portion from the first end of the second leg member toward the second end of the second leg member. The distance from the first end to a point on the second leg member may monotonically decrease over a portion of the second leg member as the point describes the profile of the portion moving along the portion from the first end of the second leg member toward the second end of the second leg member.

As another aspect of the invention, a robotic mechanism is provided. The robotic mechanism comprises: a chassis having a first side and an opposite second side; a first leg member rotatably coupled to the chassis proximate the first side; and a second leg member rotatably coupled to the chassis proximate the second side. The first leg member and the second leg member being structured upon rotation to move the chassis from a first position in which the chassis is resting on a surface to a second position in which the chassis is positioned a distance above the surface.

The first leg member may be of generally spiral shape and the second leg member may be of generally spiral shape.

As a further aspect of the invention, a method of actuating a robotic mechanism is provided. The method comprises: rotating a first leg member with respect to a chassis, rotating a second leg member with respect to the chassis, and responsive to rotation of the first leg member and rotation of the second leg member, effectuating a movement of the chassis. The first leg member being rotatably coupled to the chassis proximate a first side, the second leg member being rotatably coupled to the chassis proximate a second side and the first leg member and the second leg member being of generally spiral shape and rotate generally about a common axis that lies above a center of mass of the chassis.

The first leg member and the second leg member may be rotated at a constant speed. The first leg member and the second leg member may be rotated at a varying speed.

The method may further comprise orienting the first and second leg members out of phase with respect to each other. The step of orienting may comprise moving one of the first leg member and the second leg member about 180 degrees out of phase with the other of the first leg member and the second leg member. The step of orienting may comprise moving both the first leg member and the second leg member such that the first leg member and the second leg member are about 180 degrees out of phase with respect to each other.

The step of rotating the first leg member may comprise rotating at a constant speed and the step of rotating the second leg member may comprise rotating the second leg member at a constant speed. The step of rotating the first leg member may comprise rotating the first leg member at a varying speed and the step of rotating the second leg member may comprise rotating the second leg member at a varying speed.

The movement of the chassis may comprise a hopping motion. The movement of the chassis may comprise bipedal locomotion.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
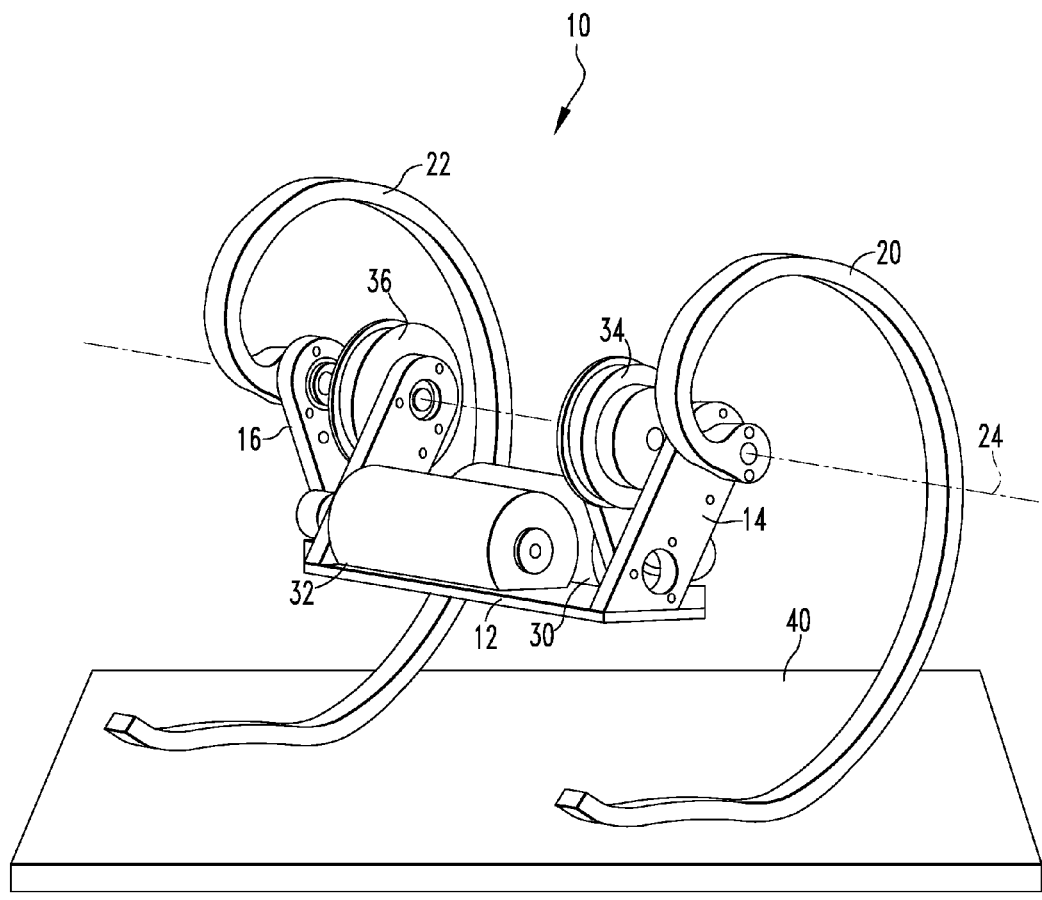
FIG. 1 is an isometric view of a robotic mechanism in accordance with an embodiment of the invention.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" refers to the quantity one or an integer greater than one (i.e., a plurality).

Referring to FIG. 1, an example robotic mechanism 10 is shown. The robotic mechanism 10 includes a chassis 12 having a first side 14 and an opposite second side 16. Chassis 12 is preferably formed from a rigid material (e.g., without limitation, aluminum, carbon fiber, wood, plastic) but may also be formed from other suitable materials. In some embodiments, the chassis 12 may be designed to accommodate a decorative and/or protective shell (not shown) that defines a certain appearance such as, without limitation, a robotic animal or a humanoid. Rotatably coupled to the first side 14 is a first leg member 20. Similarly, a second leg member 22, is rotatably coupled to the opposite second side 16. Preferably, the first leg member 20 and the second leg member 22 are coupled to the chassis 12 in a manner such that they both independently rotate about a common rotational axis 24. However, some embodiments may have both legs coupled.

In the example shown in FIG. 1, chassis 12 includes a first motor 30 and a second motor 32. An output shaft (not numbered) of the first motor 30 is coupled to the first leg member 20 via a first gear train 34 so as to translate rotational power from first motor 30 to first leg member 20. Likewise, an output shaft (not numbered) of the second motor 32 is coupled to the second leg member 22 via a second gear train 36 so as to translate rotational power from second motor 32 to second leg member 22. It is to be appreciated that although two motors 30, 32 and two gear trains 34, 36 are shown in the example described herein, a single motor coupled to one or more gear trains could be used to provide independent rotational movement to the first and second leg members 20, 22. Although not shown in the Figures, it is also to be appreciated that chassis 12 may further include motor control electronics including, but not limited to, a positioning device and power drive circuitry, as well as one or more power sources (e.g., without limitation, batteries). Such positioning device or devices are employed to measure, sense or estimate the position of each of the motors 30,32 or leg members 20,22, or a combination thereof, so that the position of each leg can be measured or estimated directly from measurements. Position estimation, sensing and measurement can occur at some or all positions of the legs or motors, and at some or all times during operation.

The position, velocity and/or timing of each leg is preferably controlled by feedback control software and electronics that have access to all leg positions or actuator positions by reading the output of the positioning device(s). The feedback control software sends independent position, velocity, acceleration or current commands to each motor and ensures tracking of such commands by reading leg position measurements. In some embodiments, additional onboard sensors such as inertia, vision and range finding sensors can be used by the feedback control software to control each of the leg members 20,22. The control software is responsible for positioning each of the leg members 20,22 at specific orientations, rotating each of the leg members 20,22 at specific speeds, and synchronizing the relative position, velocity and timing of each of the leg members 20,22.

Control of rotation of each of the leg members 20,22 can also be performed without feedback control software by directly or indirectly coupling positioning devices to the motors 30,32, whereby positions sensed, measured or estimated regulate each of the motor's 30,32 position, speed of rotation, or acceleration. Control of rotation of each of the leg members 20,22 can also be performed without feedback control software by setting the motor's 30,32 position, speed of rotation, or acceleration to predefined values without using a positioning device (open-loop control or feed-forward control). As such, it is to be appreciated, as will be described in further detail below, that chassis 12 does not require any positioning devices or other sensing equipment in order to maintain static stability.

Control of rotation of each of the leg members 20,22 can also be performed without feedback control software by setting the motor's 30,32 position, speed of rotation, or acceleration to predefined values without using a positioning device (open-loop control or feed-forward control).

Figure 2:
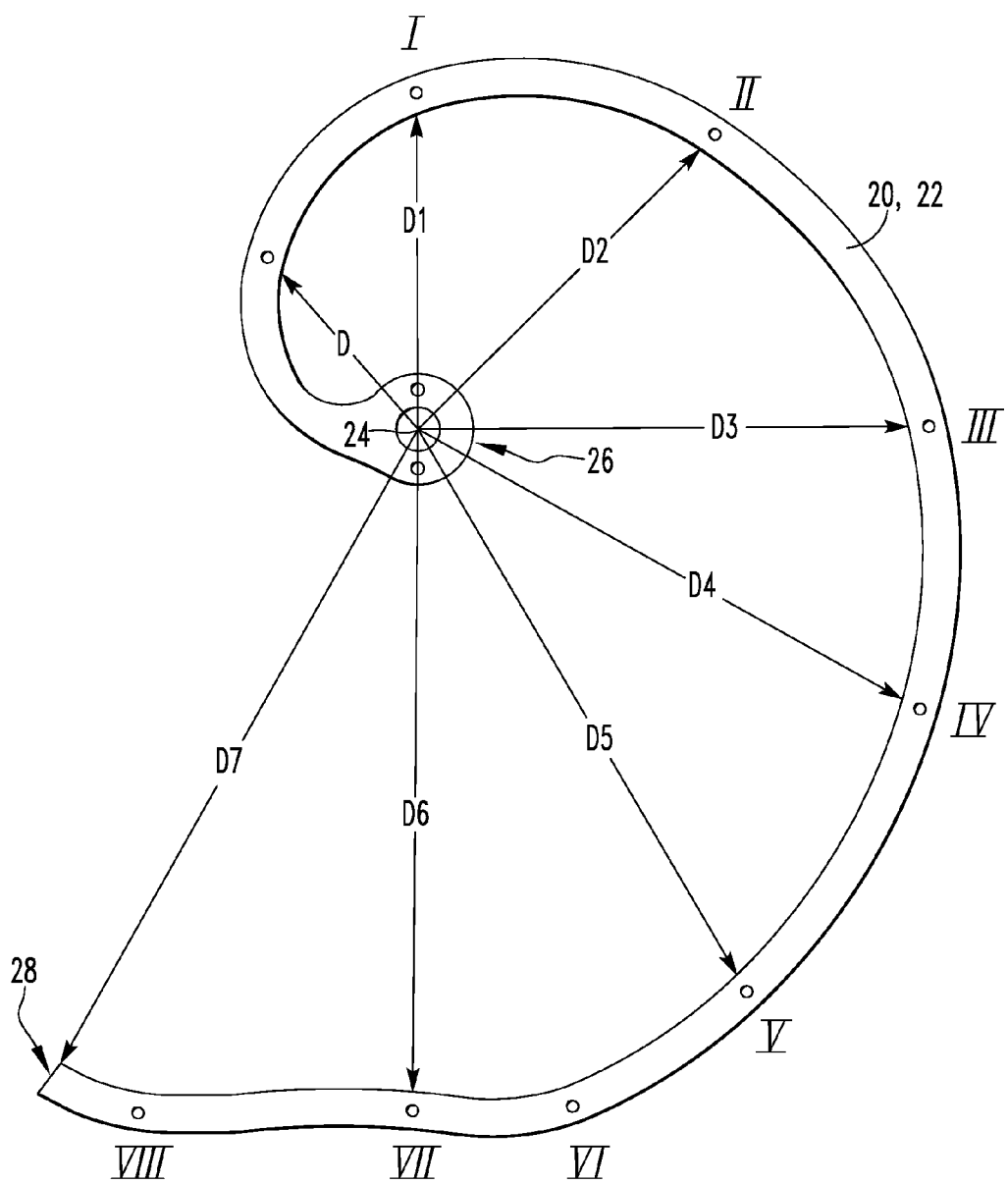
FIG. 2 is a side elevation view of a leg member of the robotic mechanism of FIG. 1.

Referring to FIG. 2, an example leg member 20,22 is shown. In an example embodiment of the present invention, such as shown in FIG. 1, both the first leg member 20 and the second leg member 22 are of substantially similar, if not identical, shape and construction. Each leg member 20,22 is preferably formed out of plastic, fiberglass or other suitable material having compliance properties to absorb at least some of the shock energy when a leg member 20,22 contacts the ground surface 40 and to restore some of the absorbed energy when the leg 20,22 leaves the ground surface 40. Although less than ideal, it is to be appreciated that leg members 20,22 may also be formed from materials lacking such compliance properties. Each leg member 20,22 has a first end 26 and a second end 28 with each leg member 20,22 being rotatably coupled to the chassis 12 at or near the respective first end 26 so as to rotate generally about the rotational axis 24 previously discussed. Each of the leg members 20,22 are preferably generally spiral shaped such that a distance D from the rotational axis 24, at or near first end 26, to a point on the leg member 20,22 generally increases monotonically as the point describes the profile of the leg member 20,22 starting from the first end 26 and ending at the second end 28. Such monotonical increase in the distance D is shown in the example of FIG. 2 in the portion of the leg member 20,22 between the first end 26 and point VI, where the distances shown are related as D<D1<D2<D3<D4<D5 with D being the least and D5 being the greatest. However, it is to be appreciated that some embodiments, (such as the one shown in the Figures) may include localized portions of the leg member 20,22 having non-monotonically increasing distances. In such localized portions, the distance from the first end may remain constant or may decrease. An example of such localized portions is shown in the example leg member 20, 22 of FIG. 2, where the distance from the first end 26 to a point on the leg member generally decreases moving from points VI to VII and generally remains constant moving from point VIII to second end 28.

Figure 3:
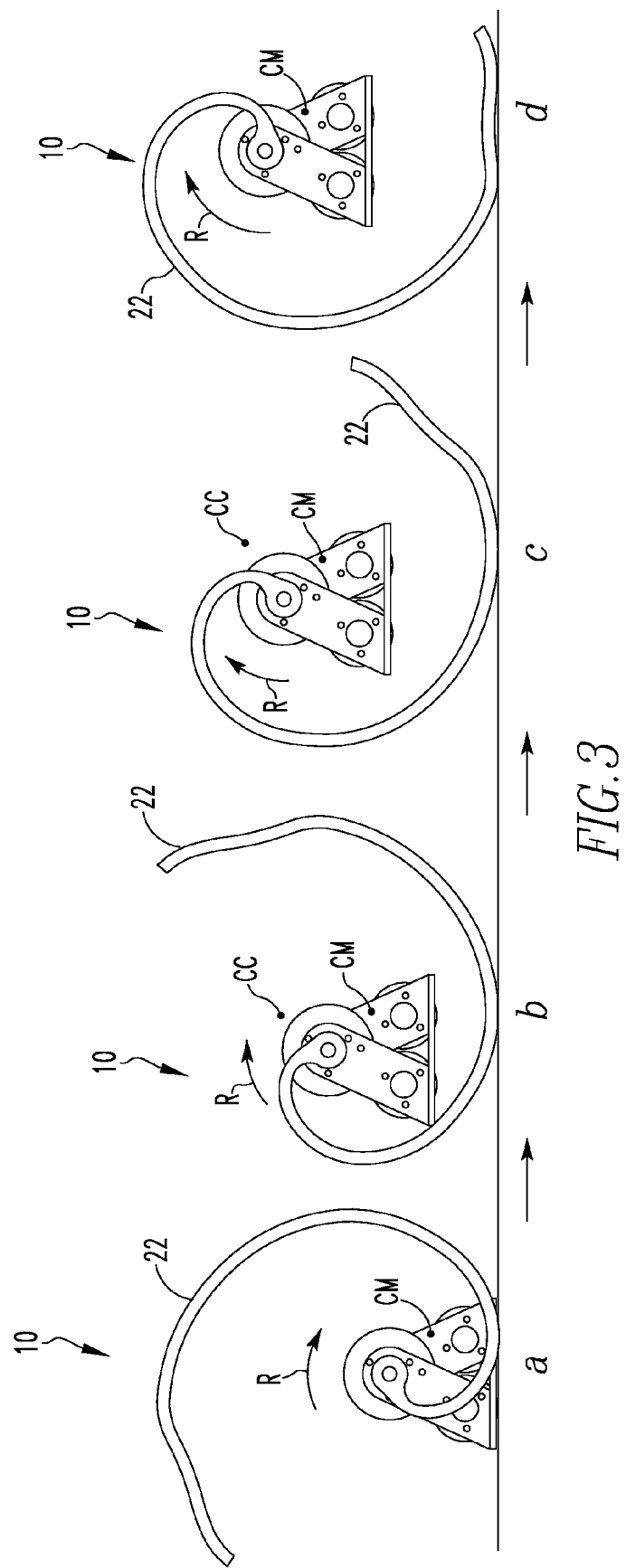
FIG. 3 is a side view of the robotic mechanism of FIG. 1 showing progressive movement of the leg members about the chassis.

Referring to FIG. 3, static stability of the robotic mechanism 10, without the need for sensing equipment, is provided by arranging the previously described components associated with the chassis (e.g., without limitation, first and second motors 30,32; first and second gear trains 34,36), relative to the chassis 12 such that the resultant center of mass CM (i.e., center of gravity) of the chassis 12 and components lies below the leg's center of curvature CC (shown approximated in positions b and c of FIG. 3) at the point (or portion) where the leg touches the ground. It is to be appreciated that the center of curvature of each of the leg members 20,22 varies along the length of the leg members 20,22 and thus is dependent upon the point (or portion) of the leg member being considered. In a preferred embodiment, the CM also lies vertically below the point of coupling of the first and second leg members 20,22. In other words, the center of mass of the chassis 12 lies below rotational axis 24. Such an arrangement allows for static stability of the robotic mechanism 10 even with point ground contacts as the gravitational force acting on the chassis 12 and related components is aligned with the reaction force (not shown) acting on each of the leg members 20,22 at all leg orientations as long as the chassis 12 is not resting on a surface. FIG. 3 shows an example of the leg members 20,22 (only second leg member 22 is visible in the side view of FIG. 3) of the robotic mechanism 10 positioned in some example possible orientations in which the chassis 12 is not resting on the surface 40 (see positions b, c and d) as well as the leg members 20,22 oriented such that the chassis 12 is resting on the surface 40 (see position a). It is to be appreciated that FIG. 3 merely shows leg members 20,22 oriented in some example positions and that leg members 20,22 rotate completely about rotational axis 24 and therefore may be positioned in any orientation relative to the chassis 12 about axis 24.

Having thus described the basic elements of the robotic mechanism 10, as well as how static stability is achieved, actuation and movement of the robotic mechanism will now be described. As shown in stages a, b, c and d of FIG. 3, the unique shape of leg members 20,22 allows for the robotic mechanism 10 to move from a position in which the chassis 12 is resting on a surface 40, shown at a, to a position in which chassis 12 is elevated above the surface 40 (shown at b, c, and d) by generally simultaneously rotating generally aligned leg members 20,22 through about 180 degrees in the direction of rotation as indicated by arrow R. By generally aligned, it is to be understood that both the first leg member 20 and the second leg member 22 are oriented with respect to the chassis 12 in a generally equivalent manner (same phase). In continued reference to FIG. 3, it can be appreciated that jumping and hopping movements of the robotic mechanism 10 can be achieved by generally simultaneously actuating the legs in the direction R at high speed while maintaining the legs in the same phase. Actuating the legs once (one complete rotation) produces jumping, more than once (multiple rotations) produces hopping. Hopping can also be produced by actuating the legs forward and backward repeatedly. During hopping, the chassis 12 does not contact the surface 40. During hopping, the phase between the first leg member 20 and the second leg member can be varied to induce turning motion. The term "phase", as used herein, is to be understood to refer to the difference of angular orientation between leg members 20 and 22.

Figure 4:
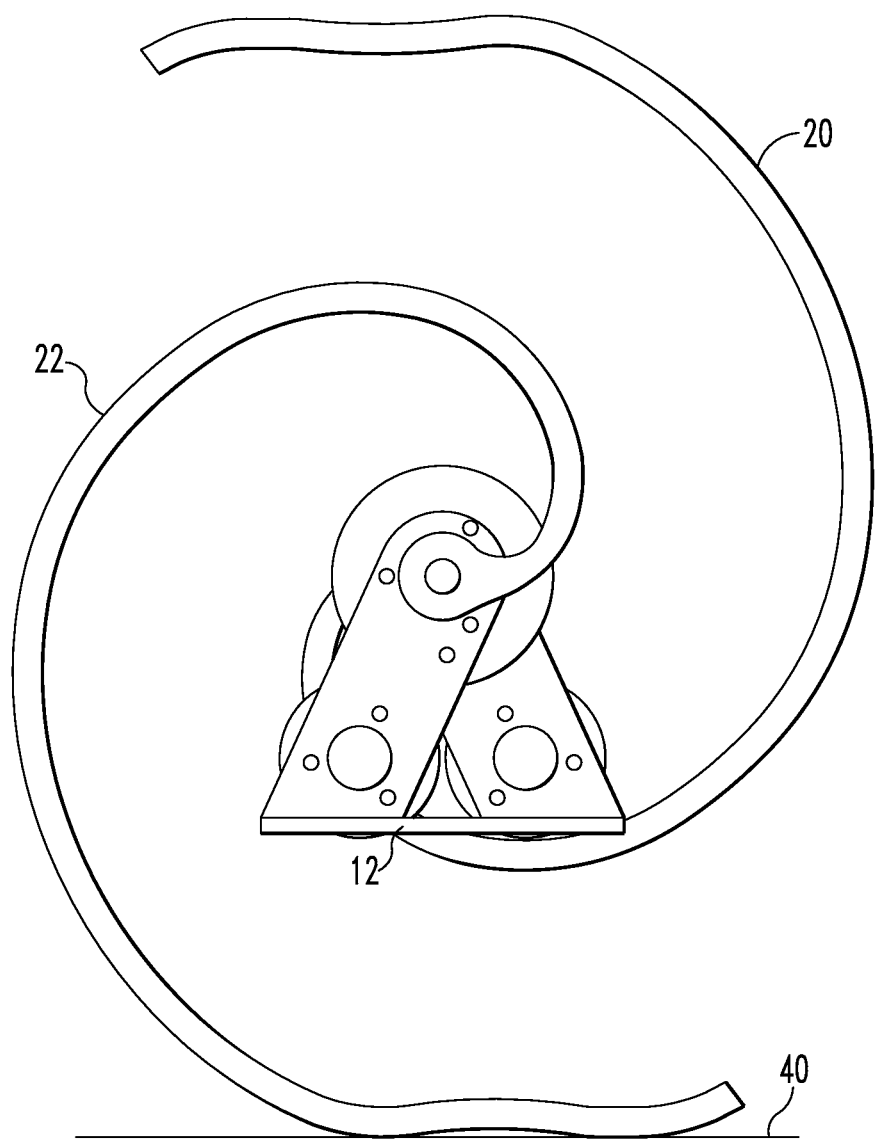
FIG. 4 is side view of the robotic mechanism of FIG. 1 showing an alternate orientation of the leg members.

Walking, jogging and running behaviors of the robotic mechanism 10 can be achieved in two ways. In a first method, the first leg member 20 and the second leg member 22 are first oriented generally about 180 degrees from one another, as shown in FIG. 4, which can be accomplished through rotation of one or both of the first and second leg members 20,22. Once the leg members 20,22 are positioned in such relative orientation, both leg members 20,22 are then actuated in the direction of motion at the same constant speed. In some embodiments, leg actuation can be performed with a single motor driving both leg members 20,22 through a gearing mechanism. It is to be appreciated that by varying the actuation speed, the movement of the robotic mechanism 10 may be varied from walking to jogging to running movements. Additionally, it is to be further appreciated that turning motions could readily be accomplished by varying the actuation speed of one or both of the leg members 20,22 (e.g., without limitation, slow only the right leg to turn right, slow only the left leg to turn left, accelerate the left leg to turn right, accelerate the right leg to turn left, or a combination of slowing one leg and accelerating the other leg).

In a second method, each of the first and second leg members 20,22 are actuated to rotate around the rotational axis 24 following a timed profile that specifies the leg angle at each instant of time. The phase of the timed profile for one of the first and second leg members 20,22 is offset from the profile of the other leg by half a period of leg rotation in order to generate an alternating biped gait. For example, first leg member 20 may follow a timed profile in which the leg member 20 rotates at a first rotational speed while in contact with the ground and at a second, faster rotational speed when not in contact with the ground. Similarly the second leg member 22 may follow the same timed profile except time delayed by half of the time it takes to complete a full revolution. Through variations in magnitudes of the rotational speeds, in the time and leg position at which each speed starts and ends, and in the duration for the legs to complete one revolution, the motion may be switched from walking, jogging or running. Walking gaits are generally characterized with at least having one leg touching the ground at any time, where as jogging and running are characterized by periods of time where no leg touches the ground. Additionally, turning behavior can be achieved by increasing or decreasing the rotation speed of the leg member 20,22 touching the ground relative to the speed of the other leg member 20,22 when it last touched the ground. Turning in place can be achieved by actuating the leg members 20,22 in opposite directions, or by actuating only one of leg members 20,22 on the side opposite of the direction of turn.

In addition to the movements previously described, it is to be appreciated that other movements/actuations could also be carried out by the robotic mechanism 10. Such other movements/actuations include, without limitation dancing and swimming. A dancing animation may be achieved by moving the leg members 20,22 independently, following two possibly different timed profiles, one for each leg. A swimming behavior may be achieved by having a positively buoyant and watertight body associated with the chassis 12 and activating the walking and turning behaviors previously described while in the water.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of actuating a robotic mechanism having a first leg member rotatably coupled to a first side of a chassis and a second leg member rotatably coupled to a second side of the chassis, the method comprising:
    positioning the first leg member and the second leg member generally about 180 degrees with respect to each other; and
    effecting a forward or rearward movement of the chassis by rotating both the first leg member and the second leg member with respect to the chassis while maintaining the relative positioning of the first leg member and the second leg member.

2. The method of claim 1 wherein positioning the first leg member and the second leg member generally about 180 degrees with respect to each other comprises:
    rotating both the first leg member and the second leg member.

3. The method of claim 1 wherein positioning the first leg member and the second leg member generally about 180 degrees with respect to each other comprises:
    rotating only one of the first leg member and the second leg member with respect to the other one of the first leg member and the second leg member.

4. The method of claim 1 wherein the first leg member and the second leg member are rotated at a constant speed.

5. The method of claim 1 wherein the first leg member and the second leg member are rotated at different speeds.

6. The method of claim 1 wherein each of the first leg member and the second leg member are each rotated according to a timed profile that specifies the position of each of the first leg member and the second leg member at each instant of time.

7. The method of claim 6 wherein the timed profile of the first leg member differs from the timed profile of the second leg member.

8. A method of actuating a robotic mechanism, the method comprising:
    rotating a first leg member with respect to a chassis;
    rotating a second leg member with respect to the chassis; and
    responsive to the rotation of the first leg member and the rotation of the second leg member, effectuating a forward or rearward movement of the chassis,
    wherein the first leg member is rotatably coupled to the chassis proximate a first side and the second leg member is rotatably coupled to the chassis proximate a second side.

9. The method of claim 8 wherein the first leg member and the second leg member rotate generally about a common axis that lies above a center of mass of the chassis.

10. The method of claim 8 wherein the first leg member and the second leg member are rotated at a constant speed.

11. The method of claim 8 wherein the first leg member and the second leg member are rotated at a varying speed.

12. The method of claim 8 further comprising orienting the first and second leg members out of phase with respect to each other.

13. The method of claim 12 wherein the step of orienting comprises moving one of the first leg member and the second leg member about 180 degrees out of phase with the other of the first leg member and the second leg member.

14. The method of claim 12 wherein orienting the first and second leg members comprises moving both the first leg member and the second leg member such that the first leg member and the second leg member are about 180 degrees out of phase with respect to each other.

15. The method of claim 12 wherein rotating the first leg member comprises rotating the first leg member at a constant speed and wherein rotating the second leg member comprises rotating the second leg member at a constant speed.

16. The method of claim 12 wherein rotating the first leg member comprises rotating the first leg member at a varying speed and wherein the step of rotating the second leg member comprises rotating the second leg member at a varying speed.

17. The method of claim 8 wherein the movement comprises a hopping motion.

18. The method of claim 12 wherein the movement comprises bipedal locomotion.

19. A robotic mechanism comprising:
    a chassis having a first side, an opposite second side and a center of mass;
    a first leg member rotatably coupled to the chassis proximate the first side; and
    a second leg member rotatably coupled to the chassis proximate the second side;
    wherein a portion of the first leg member and a portion of the second leg member are structured to engage a surface, and wherein the first leg member and the second leg member are disposed generally about 180 degrees with respect to each other about a common rotational axis.

20. The robotic mechanism of claim 19, wherein the first leg member and the second leg member rotate generally about a common axis and wherein the center of mass of the chassis is disposed below the common axis.

* * * * *